United States Patent
Thakkar et al.

(10) Patent No.: US 6,677,030 B2
(45) Date of Patent: Jan. 13, 2004

(54) RETROREFLECTIVE ARTICLES HAVING TACKIFIED ACRYLIC ADHESIVES FOR ADHESION TO CURVED LOW SURFACE ENERGY SUBSTRATES

(75) Inventors: Bimal V. Thakkar, Woodbury, MN (US); Albert I. Everaerts, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 96 days.

(21) Appl. No.: 09/826,989

(22) Filed: Apr. 5, 2001

(65) Prior Publication Data

US 2003/0136510 A1 Jul. 24, 2003

Related U.S. Application Data

(63) Continuation-in-part of application No. 08/879,897, filed on Jun. 20, 1997, now abandoned, which is a continuation-in-part of application No. 08/735,724, filed on Oct. 23, 1996, now abandoned.

(51) Int. Cl.[7] .......................... B32B 3/00; B32B 15/04; B32B 7/12; G02B 5/122; G02B 5/124
(52) U.S. Cl. ................ 428/174; 428/343; 428/355 EN; 428/355 R; 428/355 AC; 428/461; 428/141; 359/529; 359/530; 359/533; 359/534; 359/538; 156/273.3
(58) Field of Search .......................... 428/343, 355 EN, 428/355 R, 355 AC, 461, 141, 174; 359/529, 530, 533, 534, 538; 156/273.3

(56) References Cited

U.S. PATENT DOCUMENTS

| | | | |
|---|---|---|---|
| 3,551,025 A | 12/1970 | Bingham et al. ........... 350/105 |
| 3,725,115 A | 4/1973 | Christianson et al. ..... 117/93.31 |
| 4,418,120 A | 11/1983 | Kealy et al. ................. 428/343 |
| 4,640,938 A | 2/1987 | Romer et al. ................. 522/79 |
| 4,943,139 A | 7/1990 | Bacon et al. ............... 350/105 |
| 5,011,560 A | 4/1991 | Nakai et al. ............. 156/273.3 |
| 5,069,964 A | 12/1991 | Tolliver et al. ............. 428/325 |
| 5,223,312 A | 6/1993 | Langille ...................... 428/31 |
| 5,450,235 A | 9/1995 | Smith et al. ................. 359/529 |
| 5,756,584 A | 5/1998 | Bennett et al. ............. 525/205 |
| 5,805,338 A | 9/1998 | Janovec ...................... 359/529 |

FOREIGN PATENT DOCUMENTS

| | | |
|---|---|---|
| EP | 0 481 634 A1 | 4/1992 |
| WO | WO 95/11464 | 4/1995 |

OTHER PUBLICATIONS

\* Was previously cited as Applicant's copending patent application Ser. No. 08/778,797.

Primary Examiner—Harold Pyon
Assistant Examiner—Catherine A. Simone
(74) Attorney, Agent, or Firm—Carolyn A. Fischer

(57) ABSTRACT

An article comprising (a) a curved substrate having a surface energy below about 38 dynes/cm$^2$; (b) flexible retroreflective sheeting; and (c) a crosslinked pressure-sensitive adhesive adhering the sheeting to the curved substrate. The adhesive contains sufficient polar monomer and tackifier, and is sufficiently crosslinked, to (i) have a glass transition temperature less than −15° C., (ii) permit the sheeting to remain firmly bonded to a low density polyethylene barrel without buckling when cooled from 49° C. to −1° C., and (iii) provide an adhesive bond to the barrel that exhibits increased energy absorption when tested for impact resistance at 0° C. according to ASTM D4272. The adhesive can be manufactured by partially polymerizing some of the ingredients in a pouch using UV radiation, dispersing the pouch and its contents in the other ingredients using an extruder, extrusion coating the adhesive and then UV crosslinking the coating.

26 Claims, 1 Drawing Sheet

RETROREFLECTIVE ARTICLES HAVING TACKIFIED ACRYLIC ADHESIVES FOR ADHESION TO CURVED LOW SURFACE ENERGY SUBSTRATES

CROSS-REFERENCE TO RELATED APPLICATIONS

This application is a continuation-in-part of application Ser. No. 08/879,897, filed Jun. 20, 1997, now abandoned which is in turn a continuation-in-part of application Ser. No. 08/735,724, now abandoned filed Oct. 23, 1996, both incorporated by reference herein.

FIELD OF INVENTION

This invention relates to retroreflective articles comprising a curved low surface energy substrate, flexible retroreflective sheeting, and a layer of pressure-sensitive adhesive. More particularly, this invention relates to crosslinked tackified acrylic adhesives having good low temperature properties particularly suitable for adhesion to curved substrates having low surface energy.

BACKGROUND

Retroreflective materials have the property of redirecting incident light back towards its originating source. This advantageous property has led to the widespread use of retroreflective sheeting on a variety of articles. Very often retroreflective sheeting is used on flat inflexible articles, for example, road signs and barricades. However, situations frequently arise which require sheeting to be used on irregular or curved surfaces. For example, retroreflective sheeting may be adhered to irregular surfaces of traffic control devices, such as traffic cones, poles, barrels (drums), tubes, or nose cones or to vehicle bumpers or mud flaps, which requires the sheeting to adhere to a curved surface of varying circumference. In situations where the underlying surface is irregular or curved, the retroreflective sheeting desirably possesses good conformability and flexibility without sacrificing retroreflective performance.

There may also be situations where the underlying substrate expands and contracts at a different rate than the retroreflective sheeting. For example, for a temperature drop of 40° C. (104° F.), a traffic control device such as a low density polyethylene barrel would contract by about 0.80%, based on a coefficient of linear thermal expansion of 200× $10^{-6}$ (m/mK) at 20° C. For the same temperature change, a retroreflective sheeting with a polycarbonate layer would contract by only about 0.23%, based on a coefficient of linear thermal expansion of 57×$10^{-6}$ (m/mK) at 20° C. Thus, the barrel contracts almost 3.5 times more than the retroreflective sheeting. Because the retroreflective sheeting is wrapped outside of the barrel, conventional sheetings may wrinkle and lift off the barrel in response to the temperature change. In these situations, the retroreflective sheeting preferably accommodates the differences in thermal expansion and contraction without compromising retroreflectivity and without lifting off the substrate. Further, the adhesive between the sheeting and the barrel preferably accommodates these differences in thermal expansion and contraction.

Traffic control devices and vehicle parts often have low energy irregular or curved surfaces. In addition, these substrates are subject to weathering, temperature fluctuations, and impact from vehicles. Preferably, both the retroreflective sheeting and the adhesive used to secure the sheeting to these substrates perform well despite these constraints.

The two common types of retroreflective sheeting are microsphere-based sheeting and cube-corner sheeting.

Microsphere-based sheeting, sometimes referred to as "beaded" sheeting, is well known in the art and employs a multitude of microspheres, typically at least partially embedded in a binder layer and having associated specular or diffuse reflecting materials (e.g., pigment particles, metal flakes or vapor coats, etc.) to retroreflect incident light. The microspheres are separate from each other and therefore do not severely hinder the sheeting's ability to be flexed. Illustrative examples of such retroreflectors are disclosed in U.S. Pat. No. 3,190,178 (McKenzie), U.S. Pat. No. 4,025,159 (McGrath), and U.S. Pat. No. 5,066,098 (Kult).

Cube-corner sheeting typically uses a multitude of rigid interconnected cube-corner elements to retroreflect incident light. Many types of flexible cube-corner sheeting are known in the art. See for example U.S. Pat. No. 3,992,080 (Rowland), U.S. Pat. No. 4,576,850 (Martens), or U.S. Pat. No. 5,450,235 (Smith et al.).

A substantial number of pressure-sensitive adhesives (PSAs) are known in the art which have good adhesion to low energy surface substrates and include, but are not limited to, rubber-based adhesives, tackified KRATONS™, non-polar acrylates, tackified acrylics, and polyalphaolefins.

However, not all of these adhesives perform satisfactorily on curved substrates (particularly those substrates which experience expansion and contraction or are subjected to high frequency impacts). This becomes an even greater problem at low temperatures, or upon exposure to chemicals and other roadway contaminants, or after exposure to other environmental weathering factors such as sunlight.

Delamination, buckling, and even pop-off of the flexible sheeting often occur because of adhesive failure. Thus, an article having an adhesive that performs suitably despite these constraints would be advantageous.

SUMMARY OF THE INVENTION

The present invention provides retroreflective articles comprising a curved substrate having a low energy surface, flexible retroreflective sheeting, and a layer of pressure-sensitive adhesive, and a method for making such articles. The article comprises:

(a) a curved substrate having a surface energy below about 38 dynes/cm$^2$;

(b) flexible retroreflective sheeting; and (c) a crosslinked tackified pressure-sensitive adhesive adhering said sheeting to said substrate, said adhesive comprising the reaction product of:

(i) from about 65 to about 99 parts by weight of at least one monomer selected from the group consisting of a first monofunctional acrylate or methacrylate ester of a non-tertiary alkyl alcohol, and mixtures thereof, the alkyl group of which comprises from about 4 to about 12 carbon atoms, which as a homopolymer has a glass transition temperature less than −25° C.;

(ii) from about 1 to about 10 part(s) by weight of a polar monomer copolymerizable with the monomer(s) of component (i);

(iii) optionally from 0 to about 25 parts by weight of a non-polar ethylenically unsaturated monomer copolymerizable with components (i) and (ii) selected from the group consisting of alkyl (meth)acrylates, N-alkyl (meth)acrylamides, and combinations thereof, whose homopolymer has a solubility parameter of no greater than 10.50 and a Tg greater than 15° C.;

(iv) from about 1 to about 65 parts by weight of a tackifier based upon the total weight of components (i), (ii), and (iii); and (v) optionally from 0 to about 1 part by weight of a crosslinking agent based upon the total weight of components (i), (ii), and (iii)

wherein the adhesive contains sufficient amounts of components (ii) and (iv), and is sufficiently crosslinked, to:

(I) have a glass transition temperature less than about −15° C. at a frequency of 1 rad/sec as measured by dynamic mechanical analysis;

(II) enable the sheeting, when wrapped around a low density polyethylene barrel, to remain firmly bonded to the barrel without buckling when cooled from 49° C. to −1° C.; and (III) provide an adhesive bond to such barrel that exhibits increased energy absorption when tested for impact resistance at 0° C. according to ASTM D4272.

Curved substrates include, but are not limited to, a traffic post (having a radius of curvature of about 0.025 meters (1 inch)), a barrel (having a radius of curvature of about 0.23 meters (9 inches)), a nose cone (having a radius of curvature of about 0.91 meter (3 feet)) and a railroad car (having a radius of curvature of about 1.5 meters (5 feet)). Curvature is the magnitude of the rate of change of the direction of the curve with respect to arc length. The radius of curvature at a point is the reciprocal of the curvature at that point. (See *Calculus and Analytical Geometry*, Thomas, 4th ed., Addison Wesley.) The curved substrates of the present invention may have more than one radius of curvature. For example, the radius of curvature of a traffic cone varies with direction. Preferably, the curved substrates of the present invention have a radius of curvature ranging from about 2.5 cm (1 inch) to about 1.5 meters (5 feet).

The flexible sheeting may be either microsphere-based or cube-corner type and is preferably sufficiently flexible and conformable to be conformed to the surface of the substrate.

Another embodiment of the present invention is a method of making the articles of the present invention using pouched UV polymerized adhesive for extrusion coating.

Figure 1:
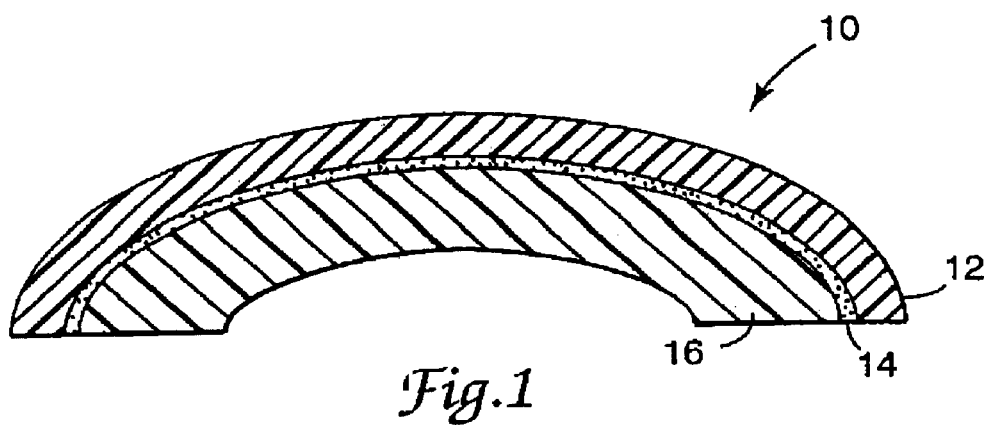
FIG. 1 is a cross-sectional view (enlarged) of an illustrative article of the present invention, comprising retroreflective sheeting (12) adhered to a curved low surface energy substrate (16) with a pressure-sensitive adhesive layer (14).

This figure is not to scale and is intended to be merely illustrative and non-limiting.

DETAILED DESCRIPTION OF ILLUSTRATIVE EMBODIMENTS

The present invention provides an article comprising flexible retroreflective sheeting, a curved polymeric low energy substrate, and an adhesive for adhering this flexible sheeting to the substrate.

The adhesive of the present invention provides good adhesion between the sheeting and the substrate even though the flexible sheeting may have a "stiff" backing and the substrate has a curved and a low energy surface. Further, the article of the present invention comprises an adhesive that preferably accommodates thermal expansion and contraction, resists severe weathering, resists impact from vehicles, and has good low temperature applicability and performance. Not all adhesives having good performance on low energy surfaces under some laboratory conditions (e.g., rubber-based adhesives, tackified KRATONS™, polyalphaolefin-based adhesives, non-polar acrylate-based adhesives, tackified acrylic adhesives, etc. applied and tested at room temperature) can meet these criteria.

The curved nature of the substrate requires an adhesive having high shear strength. High shear strength may be obtained from polar monomer interaction, crosslinking, or a combination thereof. Stiffer sheeting also may affect the shear requirement on a curved substrate. The flexible sheeting of the present invention may have a relatively stiff backing. For example, the seal or backing layer may comprise polycarbonate, polymethylmethacrylate, or poly (ethylene terephthalate).

The articles of the present invention may have either concave or convex substrates.

The sheeting may be overlapped, be spliced so that the edges meet, or be placed so that the edges do not contact one another. More than one piece of sheeting may be adhered to the substrate. Regardless of the sheeting placement, the differential in the coefficient of thermal expansion between the sheeting and the substrate remains an important factor.

The substrate has a low energy surface and therefore good wetting of the substrate by the adhesive is desirable. A low energy surface is defined herein as a surface that exhibits low polarity and a critical surface tension less than about 38 dynes/cm$^2$, preferably less than about 34 dynes/cm$^2$.

Tackifiers and plasticizers are sometimes added to adhesives to improve wetting at the surface. For example, a compatible and stable tackifier such as a rosin ester, a terpene phenolic resin, or a hydrocarbon resin may be incorporated into the adhesive. Although the use of a tackifier dramatically improves the tack at room temperature as well as the bond strength as measured by peel force at low speeds (i.e., 0.3 meters/minute (12 inches per minute)), inclusion of these tackifiers raises the glass transition temperature (Tg) of the PSA thereby reducing low temperature performance and low temperature applicability. Plasticizers tend to improve bonding, but decrease peel strength.

Additionally, loss of adhesive shear strength and of cohesive strength is also observed if large amounts of tackifier or plasticizer are incorporated into the PSA. Moreover, some tackifiers can adversely affect the weathering properties of an adhesive.

Good low temperature applicability and performance are desirable for the adhesives useful in the present invention. The PSAs preferably may be applied to curved substrates at temperatures ranging down to about −1 to 4° C. (30 to 40° F.). Higher levels of polar monomer typically adversely affect low temperature performance (e.g., impact and tack). Preferably, the adhesives of the present invention have good cold impact down to at least about −10° C. (14° F.), more preferably down to at least about −17° C. (0° F.) Cold impact performance preferably is evaluated at temperatures of 0° C. (32° F.) or less, using ASTM D4272 or a similar test. Cold impact can also be evaluated by bonding the sheeting to the side of a plastic barrel, chilling the barrel and sheeting to 0° C. or less, and driving a vehicle at 88 km/hr (55 mph) into the chilled barrel to determine whether the sheeting remains in place.

The glass transition temperature (Tg) of the adhesives useful in the present invention is less than about −15° C., and preferably less than about −20° C. at a frequency of 1 rad/sec as measured by DMA (dynamic mechanical analysis). Expressed as a range, the Tg preferably is about −15° C. to about −40° C., more preferably about −15° C. to about −30°

C. Tg values in these preferred ranges allow the adhesive to possess good peel strength and have good low temperature properties. Preferably, the adhesives also have a shear storage modulus less than about $10_6$ Pascals at a temperature of $-10°$ C.

The articles of the present invention can be subjected to harsh weather conditions such as temperature extremes, atmospheric pollutants, road salt, and infrared, visible, and ultraviolet light. Acrylic PSAs exhibit excellent outdoor durability, whereas rubber-based PSAs show poor ultraviolet and oxidative stability due to chemical unsaturation of the hydrocarbon elastomer.

The crosslinked tackified acrylic adhesives of the present invention surprisingly meet all of these criteria, whereas other adhesives that have been found to perform well on low energy surfaces at room temperature have been found to be deficient when evaluated using thermal cycling (e.g., from 49° C. to −1° C.) or impacts at low temperatures (e.g., −10° C.).

Pressure-sensitive Adhesives

An adhesive is used to adhere the flexible sheeting to the curved substrate having low surface energy. Adhesives useful in this invention are pressure-sensitive. Typically, for cube-corner sheeting, an adhesive is laminated to one side of the sealing member. For microsphere-based sheeting, the adhesive is laminated to one side of the backing.

The adhesives of the present invention preferably have good adhesion to the curved polymeric low surface energy substrate, impact resistance, weatherability, and low temperature performance and applicability.

The adhesives of the present invention are crosslinked tackified acrylic pressure-sensitive adhesives.

Acrylic Acid and Meth(acrylic) Acid Esters

The acrylic esters useful in the adhesive of the invention preferably are present at ranges of from about 65 to about 99 parts by weight, preferably about 78 to about 98 parts by weight, and more preferably about 90 to about 98 parts by weight. Useful acrylic esters include at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylates or methacrylate esters generally have, as homopolymers, glass transition temperatures below about −25° C. A higher amount of this monomer relative to the other comonomers affords the PSA higher tack at low temperatures.

Preferred acrylate or methacrylate ester monomers include, but are not limited to, those selected from the group consisting of n-butyl acrylate (BA), n-butyl methacrylate, isobutyl acrylate, 2-methyl butyl acrylate, 2-ethylhexyl acrylate, n-octyl acrylate, isooctyl acrylate (IOA), isooctyl methacrylate, isononyl acrylate, isodecyl acrylate, and mixtures thereof.

Particularly preferred acrylates include those selected from the group consisting of isooctyl acrylate, n-butyl acrylate, 2-methyl butyl acrylate, 2-ethylhexyl acrylate, and mixtures thereof.

Polar Monomers

Low levels of (typically about 1 to about 10 parts by weight, preferably from about 2 to about 7 parts by weight of a polar monomer such as a carboxylic acid can be used to increase the cohesive strength of the pressure-sensitive adhesive. At higher levels, these polar monomers tend to diminish tack, increase glass transition temperature and decrease low temperature performance.

Useful copolymerizable acidic monomers include, but are not limited to, those selected from the group consisting of ethylenically unsaturated carboxylic acids, ethylenically unsaturated sulfonic acids, and ethylenically unsaturated phosphonic acids. Examples of such monomers include those selected from the group consisting of acrylic acid (AA), methacrylic acid, itaconic acid, fumaric acid, crotonic acid, citraconic acid, maleic acid, β-carboxyethyl acrylate, sulfoethyl methacrylate, and the like, and mixtures thereof.

Other useful copolymerizable monomers include, but are not limited to, (meth)acrylamides, N,N-dialkyl substituted (meth)acrylamides, N-vinyl lactams, and N,N-dialkylaminoalkyl (meth)acrylates. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, N-vinyl pyrrolidone, N-vinyl caprolactam, and the like, and mixtures thereof.

Non-polar Ethylenically Unsaturated Monomers

The non-polar ethylenically unsaturated monomer is a monomer whose homopolymer has a solubility parameter as measured by the Fedors method (see *Polymer Handbook*, Bandrup and Immergut) of not greater than 10.50 and a Tg greater than 15° C. The non-polar nature of this monomer tends to improve the low energy surface adhesion of the adhesive. These non-polar ethylenically unsaturated monomers are selected from the group consisting of alkyl (meth) acrylates, N-alkyl (meth)acrylamides, and combinations thereof. Illustrative examples include, but are not limited to, 3,3,5-trimethylcyclohexyl acrylate, 3,3,5-trimethylcyclohexyl methacrylate, cyclohexyl acrylate, cyclohexyl methacrylate, isobornyl acrylate, isobornyl methacrylate, N-octyl acrylamide, N-octyl methacrylamide or combinations thereof.

Optionally, from 0 to 25 parts by weight of a non-polar ethylenically unsaturated monomer may be added.

Tackifiers

Preferred tackifiers include terpene phenolics, rosins, rosin esters, esters of hydrogenated rosins, synthetic hydrocarbon resins and combinations thereof. These provide good bonding characteristics on low energy surfaces. Hydrogenated rosin esters and hydrogenated $C_9$ aromatic resins are the most preferred tackifiers because of performance advantages that include high levels of "tack", outdoor durability, oxidation resistance, and limited interference in post crosslinking of acrylic PSAs.

Tackifiers may be added at a level of about 1 to about 65 parts per 100 parts of the monofunctional acrylate or methacrylate ester of a non-tertiary alkyl alcohol, the polar monomer, and the nonpolar ethylenically unsaturated monomer to achieve desired "tack". However, tackifiers typically are added at a level of about 1 to about 50 parts per 100 parts of the monofunctional acrylate or methacrylate ester of a non-tertiary alkyl alcohol, the polar monomer, and the nonpolar ethylenically unsaturated monomer. Preferably, the tackifier has a softening point of about 65 to about 100° C. Preferably, about 15 to about 65 parts, and more preferably about 25 to about 50 parts, of tackifier are added based on 100 parts of the monofunctional acrylate or methacrylate ester of a non-tertiary alkyl alcohol, the polar monomer, and the nonpolar ethylenically unsaturated monomer. However, the addition of tackifiers can reduce shear or cohesive strength and raise the Tg of the acrylic PSA, which is undesirable for cold temperature performance. Thus ordinarily the use of tackifiers would be avoided when cold temperature performance was a concern. However, we have found that the inclusion of a polar monomer and tackifier in the crosslinked adhesives of the invention can promote good wetting of low surface energy substrates and improve adhesion without adversely affecting cohesive strength and low temperature impact resistance.

Crosslinkers

In order to increase the shear or cohesive strength of acrylic pressure-sensitive adhesives, a crosslinking additive is usually incorporated into the PSA. Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "bisamide". Such chemical crosslinkers can be added into solvent-based PSAs after polymerization and activated by heat during oven drying of the coated adhesive.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals, which bring about a crosslinking reaction of the polymer. A common free radical generating reagent is benzoyl peroxide. Free radical generators are required only in small quantities, but generally require higher temperatures to complete the crosslinking reaction than those required for the bisamide reagent.

The second type of chemical crosslinker is a photosensitive crosslinker that is activated by high intensity ultraviolet (UV) light. Two common photosensitive crosslinkers used for hot melt acrylic PSAs are benzophenone and 4-acryloxybenzophenone, which can be copolymerized into the PSA polymer. Another photocrosslinker, which can be post-added to the solution polymer and activated by UV light is a triazine; for example 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenically unsaturated mono-, di- and trialkoxy silane compounds including, but not limited to, methacryloxypropyltrimethoxysilane (SILANE A-174™ available from Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinking agents.

Crosslinker is typically present from 0 to about 1 part by weight based on 100 parts by weight of acrylic acid or meth(acrylic) acid esters, polar monomers, and non-polar ethylenically unsaturated monomers.

Aside from thermal, moisture, or photosensitive crosslinkers, crosslinking may also be achieved using high-energy electromagnetic radiation such as gamma or e-beam radiation. In this case, no crosslinker may be required (i.e., component (v)).

Other Additives

Because acrylic pressure-sensitive adhesives have excellent oxidative stability, additives such as antioxidant and UV light absorbers are generally not needed.

Small amounts of heat stabilizer can be utilized in hot melt acrylic PSAs to increase thermal stability during processing.

Plasticizers

Optionally, low levels of plasticizer (e.g., less than about 10 parts by weight) may be combined with tackifier to adjust the Tg in order to optimize the peel and the low temperature performance of the adhesive. Plasticizers that may be added to the adhesive of the invention may be selected from a wide variety of commercially available materials. In each case, the added plasticizer must be compatible with the tackified acrylic PSA used in the formulation. Representative plasticizers include polyoxyethylene aryl ether, dialkyl adipate, 2-ethylhexyl diphenyl phosphate, t-butylphenyl diphenyl phosphate, di(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate.

Polymerization Methods

Adhesives useful in this invention can be polymerized by conventional free-radical polymerization methods.

For example, components (i), (ii), (iii), and optionally (iv) and (v), may be charged into a four-neck reaction vessel equipped with a stirrer, a thermometer, a condenser, addition funnel and a thermowatch. Then, a concentrated thermal free-radical initiator solution is added to the addition funnel. The whole reaction vessel and addition funnel and their contents are then purged with nitrogen to create an inert atmosphere. Once purged, the solution within the vessel is heated to the activation temperature of the initiator, the initiator is added from the funnel, and the mixture is stirred during the course of the reaction.

Another polymerization method is a two-step ultraviolet (UV) radiation initiated polymerization of a 100% solids monomer mixture. First, the low viscosity monomers are mixed at the appropriate ratios and a photoinitiator is added to the mixture. The mixture is purged with nitrogen to remove dissolved oxygen. Short exposure to UV light results in a partially polymerized syrup with moderate viscosity that can be easily coated. Tackifier, further photoinitiator and crosslinker are added to the syrup. The syrup is then coated (while excluding $O_2$) at a desired thickness, usually about 0.01 to about 0.25 millimeters (0.5 to about 10 mils). During the coating process, the syrup is further exposed to a bank of low intensity UV lights to complete the polymerization and crosslink the adhesive.

Alternatively, a polymerization method that yields an adhesive that is capable of being coated by an extruder may be used. In this method, a plastic pouch is filled with monomers and photoinitiators (i.e., precursor) and optionally tackifier, crosslinker, and plasticizer, with the addition of chain transfer agents to keep the molecular weight low enough after polymerization so that the polymer can be extruded. The pouch material typically is selected from the group consisting of ethylene-vinyl acetate, ethylene-acrylic acid, polypropylene, polyethylene, polybutadiene, and ionomeric films. The filled pouch is exposed to low intensity UV, which produces the polymerized composition inside the pouch. The pouch and contents are then fed to an extruder where the pouch is physically dispersed and other components (e.g., tackifier) may be added and melt mixed. The resulting molten composition is then hot melt coated onto a liner to yield a composition comprising a high molecular weight PSA having a small percentage of pouch material therein, typically 3 weight percent or less, after which it is then exposed to UV or to electron beam to crosslink the adhesive.

Reactive extrusion, such as the continuous free-radical polymerization methods described in U.S. Pat. Nos. 4,619,979 and 4,843,134 (both to Kotnour et al.) may also be utilized to prepare PSAs useful in this invention. Reactive extrusion is a solventless technology where the polymerization is initiated by thermal means as opposed to UV radiation. The monomers along with the initiator are fed to an extruder. The temperature along the extruder is varied to control the polymerization. Chain transfer agents are added to control the molecular weight and prevent gel formation. The adhesive obtained at the end of the extruder is hot melt coated and cured either by UV light or electron beam in order to improve its cohesive strength.

Flexible Retroreflective Sheeting

The article of the present invention comprises flexible sheeting. This flexible sheeting may be microsphere-based or cube-corner based. Suitable flexible retroreflective sheeting is known in the art and includes, but is not limited to, U.S. Pat. No. 5,066,098 (Kult et al.), U.S. Pat. No. 5,069,964 (Tolliver et al.), U.S. Pat. No. 5,064,272 (Bailey et al.), U.S. Pat. No. 4,896,943 (Tolliver et al.), U.S. Pat. No. 3,551,025 (Bingham), U.S. Pat. No. 4,950,525 (Bailey), U.S. Pat. No. 5,008,142 (Wilson et al.), U.S. Pat. No. 5,262,225 (Wilson et al.), U.S. Pat. No. 5,491,586 (Phillips), U.S. Pat. No. 5,264,063 (Martin), U.S. Pat. No. 5,415,911 (Zampa et al.), U.S. Pat. No. 5,213,872 (Pricone et al.), EP 0714040, and U.S. Pat. No. 5,514,441 (Pohto et al.).

Flexible sheeting suitable for the present invention can be applied to a post having a radius of curvature of 2.5 cm (1 inch) while maintaining good retroreflectivity.

Retroreflectivity can be measured according to the procedures set forth in ASTM E809 and ASTM E12.08.

A preferred embodiment comprises flexible retroreflective sheeting described in U.S. Pat. No. 5,450,235 (Smith et al.). This flexible sheeting comprises a body portion that includes a body layer which contains a light transmissible polymeric material having an elastic modulus less than about $7 \times 10^8$ Pascals and a plurality of cube-corner elements projecting from a first side of the body portion. The cube-corner elements comprise a light transmissible polymeric material having an elastic modulus greater than about $16 \times 10^8$ Pascals. "Elastic modulus" is defined as the elastic modulus determined according to ASTM D 882-75b using Static Weight Method A with a 12.7 cm (5 inch) initial grip separation, a 2.54 cm (1 inch) sample width, and a 2.54 cm/minute (1 inch/minute) rate of grip separation.

This flexible cube-corner sheeting comprises a multitude of cube-corner elements and a body portion. The body portion can include a land layer and a body layer. The body layer typically functions to protect the sheeting from environmental elements or to provide significant mechanical integrity to the sheeting. The land layer is the layer immediately adjacent to the base of the cube-corner elements. The cube-corner elements project from a first or rear side of the body portion. The land layer typically has a thickness in the range of about 0 to about 150 micrometers. The body layer typically has a thickness in the range of about 20 to about 1000 micrometers. The cube-corner elements typically have a height in the range of about 20 to about 500 micrometers.

A sealing layer preferably is applied to the backside of the cube-corner elements to maintain an air interface at the backside of the cubes to enhance retroreflectivity. Preferably the sealing layer comprises a polymeric material having an elastic modulus less than about $7 \times 10^8$ Pascals. Alternatively, a metallic vapor coat (e.g., aluminum) may be used. The adhesive layer is then applied to secure the sheeting to the curved substrate.

Examples of thermoplastic polymers suitable for the cube-corner elements include acrylic polymers (e.g., polymethylmethacrylate; polycarbonates; cellulosics (e.g., cellulose acetate, cellulose(acetate-co-butyrate), cellulose nitrate); epoxies; polyesters (e.g., poly(butylene terephthalate) and poly(ethylene terephthalate)); fluoropolymers; polyamides; polyetherketones; poly(etherimide); polyolefins; poly(phenylene sulfide). polystyrene and polystyrene copolymers; polysulfone; silicone modified polymers; fluorine modified polymers; and mixtures thereof.

Polymeric materials suitable for the land layer include those suitable for the cube-corner elements. The land layer may also be made from softer polymers such as those used in the body layer. Suitable polymers for the land layer include, but are not limited to, fluorinated polymers, ionomeric ethylene copolymers, low density polyethylenes, plasticized vinyl halide polymers, polyethylene copolymers, aliphatic and aromatic polyurethanes, and mixtures thereof.

Colorants, UV absorbers, light stabilizers, free radical scavengers or antioxidants, processing aids such as antiblocking agents, releasing agents, lubricants, and other additives may be added to the body portion of the cube-corner elements.

Another preferred embodiment of the present invention incorporates the sheeting described in U.S. Ser. No. 08/631,856 (Janovec), filed Apr. 10, 1996. The sheeting disclosed is capable of accommodating the expansion and contraction of the underlying polymeric substrate. The sheeting has a pillowed or curved microstructured member bonded in a regular pattern to a sealing member. The sheeting comprises: (a) a microstructured retroreflective member having a body portion and a plurality of cube-corner elements projecting from a first side of said body portion; (b) a sealing member; and (c) a network of intersecting lines bonding said first side of said body portion and said sealing member to each other in a regular pattern of cells whereby said sheeting comprises: (i) a normal state wherein said microstructured member is curved and is substantially parallel to said sealing member; and (ii) a compressed state wherein said microstructured member is arched and said sealing member is substantially flat. The cube-corner elements are preferably selected from the group consisting of acrylic, polycarbonate, polyester, polyurethane, and crosslinked acrylates. The sealing member is preferably selected from the group consisting of polyurethane, poly(ethylene terephthalate), polyethylene copolymers, ethylene methyl acrylate copolymer, ethylene ethyl acrylate copolymer, and ethylene vinyl acetate copolymer.

Another preferred embodiment of the present invention incorporates the sheeting described in WO 95/11464 (Benson et al). The ultra-flexible sheeting disclosed comprises: (a) a retroreflective layer of a two-dimensional array of independent cube-corner elements, wherein the retroreflective layer is comprised of a first polymeric material; and (b) an overlay layer comprised of a second polymeric material. The composite material is comprised of cube-corner elements directly bonded to the overlay layer substantially without an intervening land structure. The first polymeric material has an elastic modulus greater than about $25 \times 10^8$ Pascals. Preferably, the first polymeric material is selected from the group consisting of polycarbonate, polymethylmethacrylate, poly(ethylene terephthalate), and crosslinked polymers of multifunctional acrylate monomers. The second polymeric material is a thermoplastic having an elastic modulus less than about $13 \times 10^8$ Pascals. Preferably the second polymeric material is selected from the group consisting of ionomeric ethylene copolymers, aliphatic polyurethanes, aromatic polyurethanes, and combinations thereof.

Curved Low Energy Substrates

The flexible retroreflective sheeting may be adhered to a variety of curved low energy surfaces. Illustrative examples include, but are not limited to a vehicle body (e.g., a bumper), mud flaps, and traffic control devices (e.g., posts, cones, barrels).

A wide variety of polymers can be used to fabricate these low energy surfaces. For example, mud flaps tend to be rubber-based, and typically have a surface energy below about 34 dynes/cm$^2$. Traffic control elements typically are comprised of low density polyethylene (surface energy below about 31 dynes/cm$^2$), high density polyethylene (surface energy below about 34 dynes/cm$^2$), polypropylene (surface energy below about 34 dynes/cm$^2$), or their copolymers.

Preferably the radius of curvature of these substrates ranges from about 2.5 cm (1 inch) to about 1.5 meters (5 feet).

A single piece of sheeting or multiple pieces of sheeting may be applied to the curved substrate. The sheeting may be a "closed loop" or may have a gap. Further, the sheeting may be overlapped or be applied so that the edges meet, but do not overlap.

The retroreflective sheeting may be applied to the these substrates manually or through mechanical means. See for example U.S. Pat. No. 5,047,107 (Keller et al.), which discloses a mechanical means for applying sheeting to a traffic control device.

EXAMPLES

The present invention will be further described with reference to the following nonlimiting examples and test methods. All parts, percentages, and ratios are by weight unless otherwise specified.

Retroreflective Sheeting

The retroreflective sheeting used in the examples was prepared as follows:

Molten polycarbonate resin (MAKROLON™ 2407 available from Bayer Corp., Pittsburgh, Pa.) was cast onto a heated microstructured nickel tooling containing microcube prism recesses having a depth of approximately 86 micrometers (0.0034 inch). The microcube recesses were formed as matched pairs of cube-corner elements with the optical axis canted or tilted 8.15 degrees away from the primary groove, as generally described in U.S. Pat. No. 4,577,258 (Hoopman). The nickel tooling thickness was 508 micrometers (0.02 inch) and the tooling was heated to 215.6° C. (420° F.). The molten polycarbonate, at a temperature of 287.8° C. (550° F.), was cast onto the tooling at a pressure of approximately 1.03×10$^7$ to 1.38×10$^7$ Pascals (1500 to 2000 psi) for 0.7 seconds to replicate the microcube recesses. Simultaneously with filling the cube recesses, additional polycarbonate was deposited in a continuous land layer above the tooling with a thickness of approximately 51 micrometers (0.002 inch). A previously extruded 71 micrometer (0.0028 inch) thick aliphatic polyester urethane body layer (MORTHANE™ PNO3-214 available from Morton International, Seabrook, N.H.) was then laminated onto the top surface of the continuous polycarbonate land layer when the surface temperature was approximately 190.6° C. (375° F.). The nickel tooling and the polycarbonate and laminated polyurethane body layer were then cooled with room temperature air for 18 seconds to a temperature between 71.1 and 87.8° C. (160 and 190° F.), allowing the laminate materials to solidify to form the microstructured member. This member, having a substantially flat first side and a multitude of cube-corners on the second side, was then removed from the nickel tooling.

A sealing member was made using the following method. A blend of 60% aliphatic polyester urethane (MORTHANE™ PNO3-214) and 40% aromatic polyester polyurethane (including 50% aromatic polyester urethane, ESTANE™ 58810 available from B. F. Goodrich Co., Cleveland, Ohio, and 50% titanium dioxide, previously compounded in a twin screw extruder and pelletized) was extruded. One side of the sealing member was protected with a 51 micrometer (0.002 in) thick PET film.

Subsequently, the microstructured and sealing members were fed into a nip at approximately the same speed between a steel embossing roll and a rubber nip roll having a 75 Shore A durometer. The embossing pattern on the steel roll was of rectangular configuration with dimensions of 0.86 cm by 2.54 cm (0.34 inch by 1 inch).

The PET film of the microstructured member was allowed to contact the rubber roll with the cube-cornered side exposed. The PET film of the sealing member was allowed to contact the steel embossing roll with a sealing member exposed (i.e., back face bonding). The steel embossing roll was heated to 216° C. (420° F.). The rolls turned at a speed of 1.52 meters/min (5 feet/min) and the force on the nip was held at 43 N/cm (25 lb/in). As the members passed through the nip, bonds were created between the exposed sealing member and the cube-corners of the microstructured member. Both PET protective films were then removed.

Adhesive

Each of the adhesive compositions set forth in the examples was then laminated to the unbonded side of the sealing member, using an adhesive layer having a thickness of about 100 micrometers (0.0025 inch).

Curved Substrate

The sheeting was applied manually onto either a traffic control barrel or post as generally described in U.S. Pat. No. 5,026,204 (Kulp et al.).

The low density polyethylene barrels (from Traffix Devices Inc., San Clemente, Calif.) were about 1.2 meters (4 feet) tall and had 5 tapered rings each slightly larger than the next, all molded into one piece. The barrels had a radius of curvature ranging from about 20 to 25 cm (8 to 10 inches). The bases of the barrel were molded separately.

The posts (from Bent Manufacturing, Huntington Beach, Calif.) were about 1.2 meters (4 feet) tall and had a radius of curvature ranging from about 2.4 to 5 cm (1 to 2 inches).

The barrels or posts were placed onto a mandrel rotating at 1.52 meters/minute (0.5 revolutions/minute). They were then heated to a surface temperature of 49° C. (120° F.). This heating simulated operating conditions used by some manufacturers who apply retroreflective sheeting after flame-treating the barrels or posts. Immediately after heating, the sheetings were applied manually to either the barrels or the posts.

The barrels and posts were then cooled to room temperature (22° C.).

EXAMPLE 1

The following adhesives were prepared for subsequent evaluation of adhesive performance, thermal cycling testing and cold impact testing on low surface energy substrates:

Sample 1: Rubber-based Adhesive—(Comparative)

A 50/50 butadiene rubber (TAKTENE™ 220, Bayer Corp., Orange, Tex.) and PICCOLYTE™ A 135 tackifier (Hercules, Wilmington, Del.) mixture was crosslinked using e-beam. The dose levels ranged from 2 Mrad to 7 Mrad at a voltage of 225 KeV yielding gel fraction values of 0.2 to 0.35.

Gel fraction was obtained using the following method. The adhesive sample weighing about 0.3 grams was placed on a stainless steel fine mesh wire screen. The screen was folded and immersed in about 100 ml of THF for 3 days at room temperature. On removal from the solvent, the adhesive samples were dried at about 93° C. (200° F.) for 30 minutes and re-weighed. The uncrosslinked portions of the adhesive were extracted by the solvent. The gel fraction is the ratio of the final adhesive weight to its original weight. This method was also used for other samples.

This adhesive had a Tg of about −20° C. as measured from the maximum tan delta in dynamic mechanical measurements using a rheometer.

Sample 2: Tackified Block Copolymer—(Comparative)

A mixture of 39 weight percent SOLPRENE™ 411 (Fina, Dallas, Tex.), an SBS copolymer, 9 weight percent FINAPRENE™ 502 (Fina), an SBS copolymer, and 52 weight percent of PICCOLYTE™ A 135 tackifier (Hercules) was blended in solvent and coated. This adhesive is physically crosslinked through the polystyrene phase.

Sample 3: Tackified Non-polar Acrylate

The following components were mixed together:

| 95 parts | IOA (isooctyl acrylate), available from CPS Chemical, Old Bridge, NJ |
| 4.75 parts | IBA (isobornyl acrylate), available from Sartomer Co., West Chester, PA |
| 0.25 part | AA (acrylic acid), available from BASF Corp., Charlotte, NC |

A plastic pouch (ethylene-vinyl acetate) was filled with this mixture. The filled pouch was exposed to a UV blacklight to completely polymerize the adhesive. The pouch and contents were then fed to a counter-rotating 34 millimeter twin-screw extruder (Leistritz, Somerset, N.J.) at 149° C. (300° F.) where about 19, about 25 or about 29 parts of tackifier (REGALREZ™ 6108 available from Hercules) were added. The resulting compositions were hot melt coated onto a liner. Then, the extruded coatings were exposed to electron beam (about 4 to about 8 Mrad dosage at a voltage of 225 KeV) to crosslink the adhesives. The gel fractions ranged from 0.45 to 0.62.

Sample 4: Lightly Tackified Non-polar Acrylate—(Comparative)

The following components were mixed together:

| 75 parts | IOA |
| 24.5 parts | IBA |
| 0.5 part | AA | and polymerized using the method described in Sample 3 except 5 pph of tackifier was added. The e-beam dose levels varied from 3 to 6 Mrad at a voltage of 225 KeV yielding gel fractions ranging from 0.35 to 0.65.

Sample 5: Tackified Acrylate

The following components were mixed together:

| 97 parts | IOA |
| 3 parts | AA | and polymerized using the method described in Sample 3 except about 30 or about 39 pph of tackifier (FORAL™ 85, available from Hercules) was added. The e-beam dose level ranged from 4 to 8 Mrad at a voltage of 225 KeV yielding gel fraction values from 0.36 to 0.61. The respective Tg values for adhesives containing about 30 and about 39 pph of tackifier were −23° C. and −20° C.

Sample 6: Tackified Acrylate

The following components were mixed together:

| 98 parts | IOA |
| 2 parts | AA | and combined with about 30 to about 39 pph of tackifier (FORAL™ 85, available from Hercules) and polymerized as described in Sample 5.

Sample 7: Tackified Acrylate

The following components were mixed together:

| 95 parts | IOA |
| 5 parts | AA | and combined with about 14 pph or about 33 pph of tackifier (FORAL™ 85, available from Hercules) and polymerized as described in Sample 5. The respective Tg values for these adhesives were −28° C. and −19° C.

Sample 8: Tackified Polyalphaolefin—(Comparative) Polyoctene and tackifier were mixed together in the following ratio:

70 parts polyoctene (available from Eastman Chemical, Kingsport, TN)

30 parts REGALREZ ™ 1126 (available from Hercules)

Then, 0.12 weight percent of t-butyl anthraquinone (Aldrich, Milwaukee, Wis.) was added as the UV crosslinker and each composition was crosslinked at a UV energy of 800 mJ/cm$^2$. The resulting gel fractions ranged from about 0.45 to about 0.6.

Sample 9: Untackified Acrylic—Comparative

The following components were mixed together:

| 93 parts | IOA |
| 7 parts | AA | and polymerized in the presence of a solvent (ethyl acetate). Crosslinker (0.05 pph bisamide) was then added and the resulting adhesive was coated onto a liner.

Samples 10 through 13: Commercial Acrylic PSAs (Comparative)

Four commercially available PSAs were obtained from 3M. Set out below in Table 1 are the sample number, adhesive identifier, acrylic ester/polar monomer content, tackifier level, whether or not the adhesive was crosslinked, and the Tg of each adhesive:

TABLE 1

| Sample | Adhesive Identifier | Acrylic Ester/Polar Monomer Content | Tackifier Level (pph) | Crosslinked? | Tg, ° C. |
| --- | --- | --- | --- | --- | --- |
| 10 | 927 | 95.5/4.5 | 62 | No | −10° C. |
| 11 | 9469 | 90/10 | None | Yes | −9° C. |
| 12 | M41 | 94/6 | 47 | Yes | −10° C. |
| 13 | Y4032 | 90/10 | None | Yes | −4° C. |

The above adhesives were used to laminate retroreflective sheeting to traffic control barrels, posts and other substrates and evaluated using various thermal cycling and cold impact tests.

Thermal Cycling

Samples of the sheeting, approximately 1.5 to 1.8 meters (5 to 6 feet) long and about 0.14 meter (5.5 inches) wide were placed on a barrel heated to 49° C. These sheets were completely wrapped around the barrel and overlapped about 5 to 8 cm (2 to 3 inches). The wrapped barrels were cooled to room temperature. After remaining one day at room temperature, each barrel was inspected for lifting of the sheeting. Subsequently, each barrel was placed in a cold truck at about −1° C. (30° F.). After 2 to 3 days, the barrels were again inspected for further lifting of the sheeting from the barrels. A rating was assigned for each delamination ("failure") observed on a barrel, and the number of failures per barrel was tabulated for each rating. Failure rating values of 2 through 5 were assigned as follows:

| | |
|---|---|
| 5 | Delamination throughout the width (0.14 meter) of the sheeting and 2 to 3 cm along the length of the sheeting |
| 4 | Delamination throughout the sheeting width but narrow in length (less than 2 cm) |
| 3 | Delamination to >50% of the sheeting width (greater than about 0.07 meters) |
| 2 | Delamination to <50% of the sheeting width (less than about 0.07 meters) |

Instances of buckling at the overlap splice were also noted for each barrel.

Cold Impact Tests

Square 10 cm by 10 cm samples of retroreflective sheeting having a thickness of 0.35556 mm and an adhesive layer with a thickness of 0.010 mm were adhered to polyethylene sheets having a thickness of 2.286 to 2.54 mm and subjected to cold impact testing. The cold impact test was performed according to ASTM D4272, but using the specimen thickness identified above, a test temperature of 0° C., and a DYNATUP™ 730 impact tester (available from Instron Corp.) whose impact dart had a mass of 4.54 Kg, a diameter of 9.53 mm, and an impact velocity of 4.2 m/s. The samples were chilled below 0° C. using liquid nitrogen, allowed to warm up, and tested for cold impact when the sample temperature reached 0° C. Energy to rupture values were calculated in Joules according to ASTM D4272.

The above-mentioned wrapped barrels were also placed outdoors in cold weather and impacted with a truck driven at 88 km/hr (55 mph). The samples shown in Table 2 were impacted at about −11° C. (12° F.) and the samples shown in Table 3 were impacted at −18° C. (0° F.). The barrels were then visually inspected and either "passed" or "failed" based on whether the sheeting came off the barrel.

Set out below in Tables 2 through 4 are results for the above tests.

TABLE 2

| | # Failures on cooling from 49° C. (120° F.) to 22° C. (72° F.) at rating: | | | | # Failures on cooling from 22° C. (72° F.) to −1° C. (30° F.) at rating: | | | | Total # Failures with rating | Cold Impact at |
|---|---|---|---|---|---|---|---|---|---|---|
| Sample | 5 | 4 | 3 | 2 | 5 | 4 | 3 | 2 | ≧3 | −11° C. |
| 1 | 4 | 0 | 0 | 0 | 0 | 0 | 0 | 1 | 4 | Passed |
| 2 | 0 | 0 | 3 | 2 | 0 | 1 | 5 | 23 | 9 | Failed |
| 3 | 0 | 0 | 0 | 2 | 0 | 0 | 2 | 2 | 2 | Passed |
| 4 | 1 | 1 | 4 | 3 | 0 | 0 | 0 | 3 | 6 | Failed |
| 8 | 0 | 1 | 2 | 5 | 0 | 0 | 1 | 1 | 4 | Failed |
| 9 | 0 | 1 | 2 | 4 | 0 | 0 | 3 | 4 | 6 | Failed |

TABLE 3

| Sample | Tackifier Level (pph) | E-beam Dose, Mrad | Gel Fraction | Total # Failures on cooling from 49° C. (120° F.) to −1° C. (30° F.) at rating*: 3 | 2 | Buckling at overlap splice** | Cold Impact at −18° C. |
|---|---|---|---|---|---|---|---|
| 3 | 19 | 4 | 0.37 | 1 | 8 | Yes | Passed |
| 3 | 19 | 5 | 0.49 | 2 | 1 | Yes | Passed |
| 3 | 19 | 6 | 0.54 | 0 | 1 | Yes | Passed |
| 3 | 19 | 7 | 0.61 | 1 | 7 | Yes | Passed |
| 3 | 25 | 5 | 0.41 | 0 | 3 | Yes | Passed |
| 3 | 25 | 6 | 0.50 | 0 | 3 | Yes | Passed |
| 3 | 25 | 7 | 0.55 | 0 | 1 | Yes | Passed |
| 3 | 25 | 8 | 0.61 | 0 | 7 | Yes | Passed |
| 3 | 29 | 6 | 0.55 | 0 | 3 | Yes | Passed |
| 3 | 29 | 8 | 0.62 | 1 | 7 | Yes | Passed |
| 5 | 39 | 5 | 0.56 | 0 | 1 | No | Passed |
| 5 | 30 | 5 | 0.62 | 1 | 2 | No*** | Passed |

*All failures had either a 3 or 2 rating
**Buckling throughout the width of the sheeting
***Some buckling, but not throughout entire width of sheeting

TABLE 4

| Sample | Tackifier Level (pph) | Tg, ° C. | Energy To Rupture, Joules |
|---|---|---|---|
| Control (no adhesive) | — | | 27.9 |
| 5 | 39 | −20° C. | 30.4 |
| 7 | 14 | −28° C. | 29.0 |
| 7 | 33 | −19° C. | 30.4 |
| 10 | 62 | −10° C. | 27.3 |
| 11 | None | −9° C. | 28.2 |
| 12 | 47 | −10° C. | 27.1 |
| 13 | None | −4° C. | 28.3 |

The above data show that adhesives having an appropriate Tg and tackifier level provided improved cold impact performance.

EXAMPLE 2

The flexible sheeting described above was applied at room temperature to polyethylene barrels using the adhesive compositions set out below in Table 5. The barrels were placed in an oven at about 49° C. (120° F.) for 3 days, removed from the oven and kept at room temperature for about 24 hours, then placed in a cold truck at about −1° C. (30° F.) for about 1 week. The barrels were analyzed for delamination and buckling. The above-defined ratings were used to evaluate the adhesive performance.

TABLE 5

| Sample | Tackifier Level FORAL 85, pph | E-beam Dose Level (Mrad) | # of Failures at Each Rating: | | | | Buckling at Overlap Splice |
|---|---|---|---|---|---|---|---|
| | | | 5 | 4 | 3 | 2 | |
| 6 | 30 | 4 | 0 | 0 | 0 | 0 | 0 |
| 6 | 30 | 5 | 0 | 1 | 0 | 0 | 3 |
| 6 | 30 | 6 | 0 | 0 | 0 | 2 | 0 |
| 6 | 30 | 7 | 0 | 0 | 0 | 1 | 2 |
| 6 | 30 | 8 | 0 | 0 | 1 | 1 | 4 |

TABLE 5-continued

| Sample | Tackifier Level FORAL 85, pph | E-beam Dose Level (Mrad) | # of Failures at Each Rating: | | | | Buckling at Overlap Splice |
|---|---|---|---|---|---|---|---|
| | | | 5 | 4 | 3 | 2 | |
| 6 | 39 | 4 | 0 | 0 | 0 | 0 | 0 |
| 6 | 39 | 5 | 0 | 0 | 0 | 0 | 0 |
| 6 | 39 | 6 | 0 | 0 | 0 | 0 | 0 |
| 6 | 39 | 7 | 0 | 0 | 0 | 0 | 3 |
| 6 | 39 | 8 | 0 | 0 | 0 | 0 | 4 |
| 5 | 30 | 4 | 0 | 0 | 0 | 0 | 0 |
| 5 | 30 | 5 | 0 | 0 | 0 | 0 | 0 |
| 5 | 30 | 6 | 0 | 0 | 0 | 0 | 3 |
| 5 | 30 | 7 | 0 | 1 | 0 | 0 | 4 |
| 5 | 30 | 8 | 0 | 0 | 0 | 1 | 4 |
| 5 | 39 | 4 | 0 | 0 | 0 | 0 | 0 |
| 5 | 39 | 5 | 0 | 0 | 0 | 1 | 0 |
| 5 | 39 | 6 | 0 | 0 | 0 | 1 | 3 |
| 5 | 39 | 7 | 0 | 0 | 0 | 0 | 1 |
| 5 | 39 | 8 | 0 | 0 | 0 | 0 | 0 |

The above data illustrate that in general, a higher tackifier level and a lower e-beam dosage level are preferred.

EXAMPLE 3

A layer of the Sample 6 adhesive (containing 23 weight percent tackifier (30 pph) and e-beam treated at 8 Mrad) was laminated to the above-described retroflective sheeting The sheeting was cut to different lengths and then applied to a barrel as follows, and otherwise using the method described above:

| | |
|---|---|
| Sample A | a single piece of sheeting (about 1.5 meter in length) with one 2.5 to 5 cm overlap splice |
| Sample B | 2 pieces of sheeting, each 0.75 meter in length, with two 2.5 to 5 cm overlap splices |
| Sample C | 3 pieces of sheeting, each about 0.6 meter in length, with three 2.5 cm overlap splices. |

A thermal cycling test was then used to evaluate the sheeting: After the sheeting was applied to the barrel at room temperature, the barrel was placed in an oven at about 49° C. (120° F.) for 24 hours. The barrel was then kept at room temperature for 48 hours and inspected for delamination of the sheeting. The barrel was then placed in a cold truck at −1° C. (30° F.) for an additional 48 hours and again inspected for delamination. The above-defined rating system was used to evaluate the adhesives. The results are shown below in Table 6.

TABLE 6

| Sample | R.T. after being heated to 49° C. (120° F.) | At −1° C. (30° F.) |
|---|---|---|
| A | 5-at overlap splice | 5-at overlap splice 2 places with 3 rating |
| B | 4-at both overlap splices | 4-at overlap splice 2 places with 2 rating |
| C | 4-at all overlap splices | 5-at all overlap splices |

EXAMPLE 4

A layer of the Sample 5 adhesive (containing 39 pph tackifier and e-beam treated at 4 Mrad) was laminated to a 40 cm (16 inch) long piece of retroreflective sheeting and then placed around a traffic cone having a 2 inch radius of curvature using the method described above. Using the thermal cycling test of Example 3, no delamination was observed.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An article comprising:
   (a) a curved substrate having a surface energy less than or equal to that of high density polyethylene;
   (b) flexible retroreflective sheeting; and
   a crosslinked tackified pressure-sensitive adhesive adhering said sheeting to said substrate, said adhesive comprising the reaction product of:
   (i) from about 65 to about 99 parts by weight of at least one monomer selected from the group consisting of a first monofunctional acrylate or methacrylate ester of a non-tertiary alkyl alcohol, and mixtures thereof, the alkyl group of which comprises from about 4 to about 12 carbon atoms, which as a homopolymer has a glass transition temperature less than −25° C.;
   (ii) from about 1 to about 10 part(s) by weight of a polar monomer copolymerizable with the monomer(s) of component (i);
   (iii) optionally from 0 to about 25 parts by weight of a non-polar ethylenically unsaturated monomer copolymerizable with components (i) and (ii) selected from the group consisting of alkyl (meth)acrylates, N-alkyl (meth)acrylamides, and combinations thereof, whose homopolymer has a solubility parameter of no greater than 10.50 and a Tg greater than 15(C;
   (iv) from about 1 to about 65 parts by weight of a tackifier based upon the total weight of components (i), (ii), and (iii); and
   (v) optionally from 0 to about 1 part by weight of a crosslinking agent based upon the total weight of components (i), (ii), and (iii)
   wherein the adhesive contains sufficient amounts of components (ii) and (iv), and is sufficiently crosslinked, to:
   (I) have a glass transition temperature less than about −15° C. at a frequency of 1 rad/sec as measured by dynamic mechanical analysis; and
   (II) enable the sheeting, when wrapped around a low density polyethylene barrel, to remain firmly bonded to the barrel without buckling when cooled from 49° C. to −1° C.

2. The article of claim 1, wherein said curved substrate comprises a radius of curvature ranging from about 2.5 cm to about 1.5 meters.

3. The article of claim 1, wherein said adhesive further comprises from about 1 to about 10 parts by weight of plasticizer based on 100 parts by weight of components (i), (ii), and (iii).

4. The article of claim 3, wherein said plasticizer is selected from the group consisting of polyglycol ethers, polyethylene oxides, phosphate esters, aliphatic carboxylic acid esters, benzoic esters, sulfonamides, aromatic carboxylic acid esters, and mixtures thereof.

5. The article of claim 1, wherein said polar monomer is selected from the group consisting of ethylenically unsaturated carboxylic acids, ethylenically unsaturated sulfonic acids, ethylenically unsaturated phosphoric acids, (meth) acrylamides, N,N-dialkyl substituted (meth)acrylamides, N-vinyl lactams, N,N-dialkylaminoalkyl (meth)acrylates, and mixtures thereof.

6. The article of claim 1, wherein said nonpolar ethylenically unsaturated monomer is selected from the group consisting of 3,3,5-trimethylcyclohexyl (meth)acrylate, cyclohexyl (meth)acrylate, isobornyl (meth)acrylate, and N-octyl (meth)acrylamide.

7. The article of claim 1, wherein said tackifier is selected from the group consisting of rosin esters, esters of hydrogenated resins, hydrogenated C9 aromatic resins, and terpene phenolic resins.

8. The article of claim 1, wherein said tackifier has a softening point of about 65 to about 86° C.

9. The article of claim 1, wherein said adhesive comprises from about 15 to about 65 parts by weight of tackifier based on 100 parts by weight of components (i), (ii), and (iii).

10. The article of claim 1, wherein said adhesive comprises from about 25 to about 50 parts by weight of tackifier based on 100 parts by weight of components (i), (ii), and (iii).

11. The article of claim 1, wherein said adhesive is crosslinked via electron beam, UV radiation, thermal activation, or moisture cure.

12. The article of claim 1, wherein the glass transition temperature of the adhesive is about −20 to about −40° C.

13. The article of claim 1, wherein said flexible sheeting is selected from the group consisting of microsphere-based sheeting and cube-corner sheeting.

14. The article of claim 1, wherein said flexible sheeting is capable of being applied to a post having a radius of curvature of about 2.5 centimeters while maintaining good retroreflectivity and good adhesion when cooled to −1° C.

15. The article of claim 1, wherein said flexible sheeting comprises:
(a) a body portion having a body layer comprising a polymeric material having an elastic modulus less than about $7 \times 10^8$ Pascals; and
(b) a plurality of cube-corner elements projecting from the first side of the body portion wherein said elements comprise a material having an elastic modulus greater than about $16 \times 10^8$ Pascals.

16. The article of claim 15, wherein said flexible sheeting further comprises a sealing layer.

17. The article of claim 1, wherein said curved substrate comprises a traffic control device.

18. The article of claim 17, wherein said traffic control device is selected from the group consisting of a post, a cone, a barrel, and a nose cone.

19. The article of claim 1, wherein said curved substrate comprises a vehicle part.

20. The article of claim 19, wherein said vehicle part comprises a bumper or a mud flap.

21. The article of claim 1, wherein said curved substrate comprises low density polyethylene, high density polyethylene, polypropylene, or a copolymer thereof.

22. The article of claim 1, wherein said curved substrate comprises polyethylene.

23. The article of claim 1, wherein said curved substrate comprises polypropylene.

24. An article comprising:
(a) a curved substrate selected from the group consisting essentially of rubber, low density polyethylene, high density polyethylene, polypropylene or their copolymers;
(b) flexible retroreflective sheeting; and
(c) a crosslinked tackified pressure-sensitive adhesive adhering said sheeting to said substrate, said adhesive comprising the reaction product of:
(i) from about 65 to about 99 parts by weight of at least one monomer selected from the group consisting of a first monofunctional acrylate or methacrylate ester of a non-tertiary alkyl alcohol, and mixtures thereof, the alkyl group of which comprises from about 4 to about 12 carbon atoms, which as a homopolymer has a glass transition temperature less than −25° C.;
(ii) from about 1 to about 10 part(s) by weight of a polar monomer copolymerizable with the monomer(s) of component (i);
(iii) optionally from 0 to about 25 parts by weight of a non-polar ethylenically unsaturated monomer copolymerizable with components (i) and (ii) selected from the group consisting of alkyl (meth)acrylates, N-alkyl (meth)acrylamides, and combinations thereof, whose homopolymer has a solubility parameter of no greater than 10.50 and a Tg greater than 15° C.;
(iv) from about 1 to about 65 parts by weight of a tackifier based upon the total weight of components (i), (ii), and (iii); and
optionally from 0 to about 1 part by weight of a crosslinking agent based upon the total weight of components (i), (ii), and (iii)
wherein the adhesive contains sufficient amounts of components (ii) and (iv), and is sufficiently crosslinked, to:
(I) have a glass transition temperature less than about −15° C. at a frequency of 1 rad/sec as measured by dynamic mechanical analysis; and
(II) enable the sheeting, when wrapped around a low density polyethylene barrel, to remain firmly bonded to the barrel without buckling when cooled from 49° C. to −1° C.

25. The article of claim 24, wherein the glass transition temperature of the adhesive is less than about −20° C.

26. The article of claim 24, wherein said flexible sheeting is selected from the group consisting of microsphere-based sheeting and cube-corner sheeting.

* * * * *

UNITED STATES PATENT AND TRADEMARK OFFICE
CERTIFICATE OF CORRECTION

PATENT NO. : 6,677,030 B2
DATED : January 13, 2004
INVENTOR(S) : Thakkar, Bimal V.

It is certified that error appears in the above-identified patent and that said Letters Patent is hereby corrected as shown below:

<u>Column 18,</u>
Line 18, insert -- (c) -- preceding "a".
Line 37, "15(c;" should be -- 15ºC, --

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,677,030 B2
DATED         : January 13, 2004
INVENTOR(S)   : Thakkar, Bimal V.

It is certified that error appears in the above-identified patent and that said Letters Patent is hereby corrected as shown below:

<u>Title page,</u>
Item [56], References Cited, U.S. PATENT DOCUMENTS, insert:
-- 5,861,211    01-1999    Thakkar et al.    428/343
   6,012,818    01-3000    Araki, Yoshinori  359/529
   6,280,557    08-2001    Peloquin et al.   156/275.7 --
FOREIGN PATENT DOCUMENTS, insert -- WO 98/17466   04-1998   PC   Thakkar et al. --.

<u>Column 5,</u>
Line 4, "$10_6$" should be -- $10^6$ --.

<u>Column 6,</u>
Line 24, "Bandrup" should be -- Brandrup --.

<u>Column 11,</u>
Line 18, delete "the" preceding "these".

<u>Column 14,</u>
Line 60, "9469" should be -- Y9469 --.
Line 62, "Y4032" should be -- 4032 --.

<u>Column 16,</u>
Line 53, insert -- . -- preceding "The".

<u>Column 17,</u>
Line 28, "retroflective" should be -- retroreflective --.
Line 28, insert -- . -- preceding "The".

UNITED STATES PATENT AND TRADEMARK OFFICE
CERTIFICATE OF CORRECTION

PATENT NO.   : 6,677,030 B2
DATED        : January 13, 2004
INVENTOR(S)  : Thakkar, Bimal V.

It is certified that error appears in the above-identified patent and that said Letters Patent is hereby corrected as shown below:

Column 18,
Line 18, insert -- (c) -- preceding "a".
Line 37, "15(c;" should be -- 15º C, --.

Signed and Sealed this

Third Day of August, 2004

JON W. DUDAS
*Acting Director of the United States Patent and Trademark Office*